Jan. 13, 1953  H. A. PURSCHE  2,625,090
TWO-WAY PLOW
Filed July 14, 1947  5 Sheets-Sheet 1
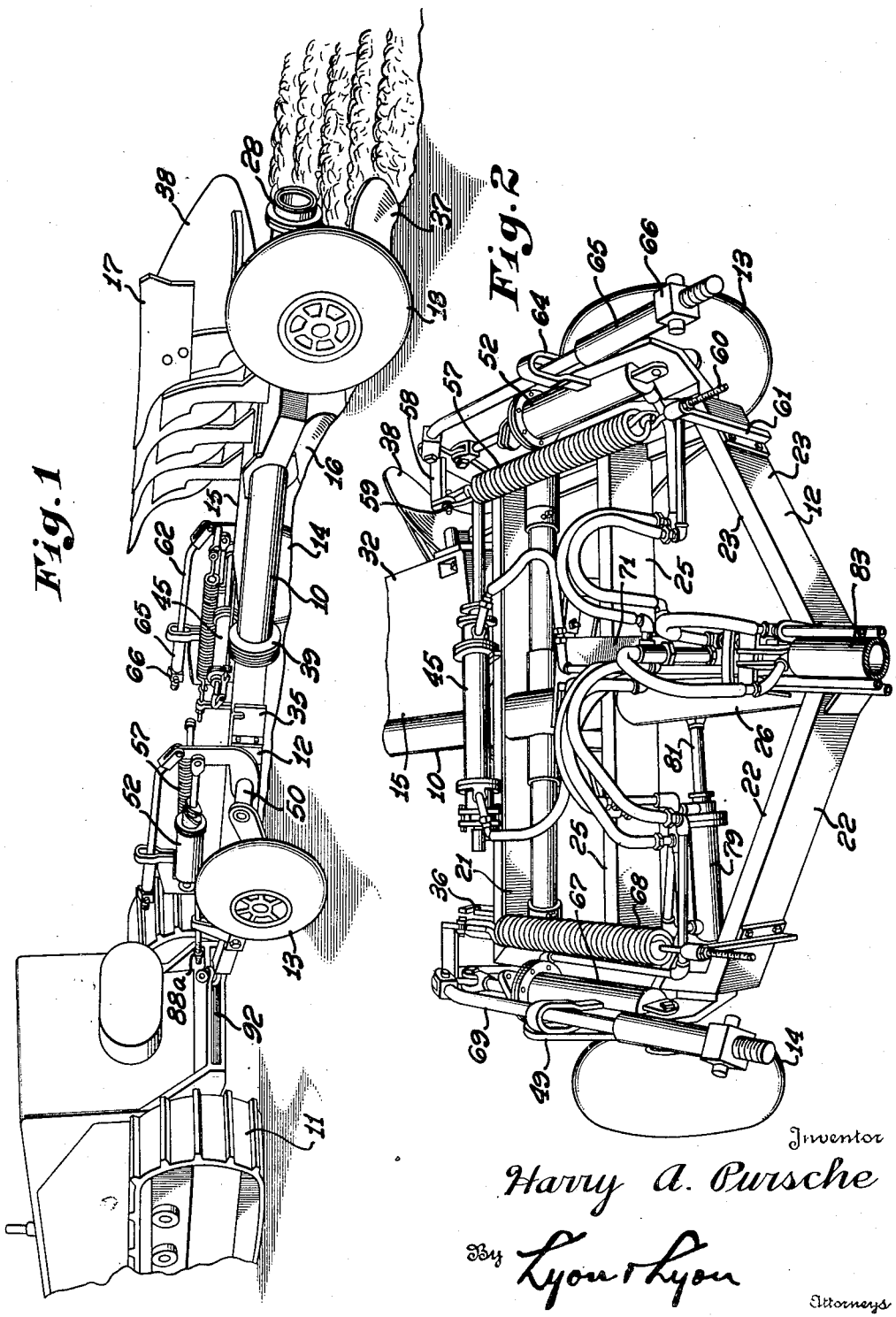
Inventor
Harry A. Pursche
By Lyon & Lyon
Attorneys

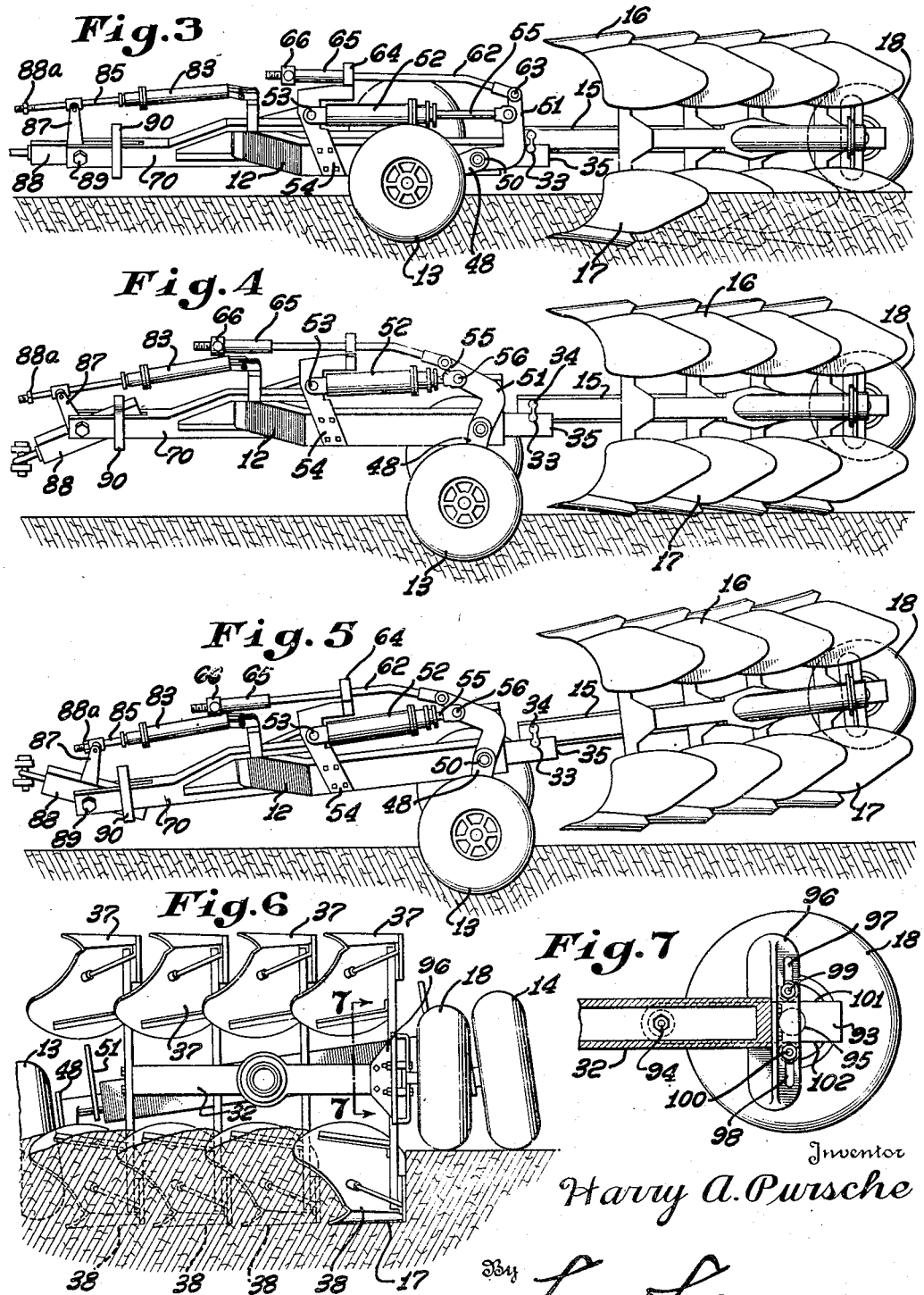

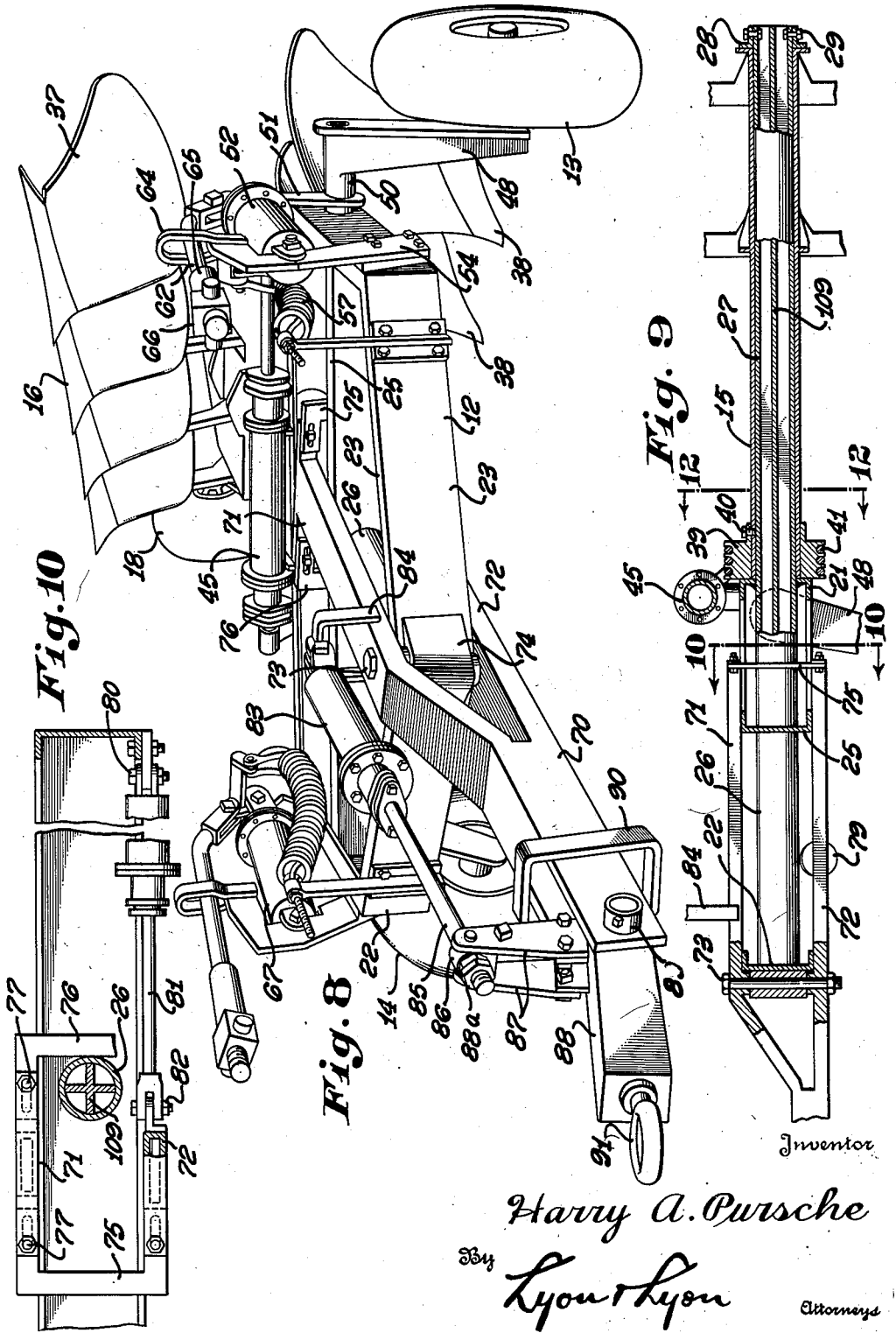

Patented Jan. 13, 1953

2,625,090

UNITED STATES PATENT OFFICE 2,625,090

TWO-WAY PLOW

Harry A. Pursche, Gardena, Calif.

Application July 14, 1947, Serial No. 760,846

27 Claims. (Cl. 97—26)

This invention relates to a two-way plow, and is particularly directed to a plow assembly having a right hand gang and a left hand gang of plow shares, which may be operated sequentially in plowing a field.

Two-way plows have been found to be superior to the conventional one-way plow in maintaining a level field, so that hills and gullies are avoided and the irrigation of the field is facilitated. One gang of plows is employed while the device is pulled across the field in one direction, and when the device is returned parallel to the furrow just completed the other gang of plows is used and, accordingly, no gully is formed. The usual leveling operations subsequent to plowing are thereby eliminated.

Accordingly, the principal object of this invention is to provide an improved form of two-way plow.

Another object is to provide a plow of this type with which the plow gangs are rotatable about an axis extending longitudinally of the plow frame.

Another object is to provide a plurality of wheels for supporting the entire plow assembly during plowing operations in a manner so that substantially no vertical forces are transmitted to the towing vehicle.

Another object is to provide a plow of this type in which the plow gang assembly, including the right hand plow shares and the left hand plow shares, are removable axially, as a unit.

Another object is to provide a two-way plow of this type employing a rear wheel, which rolls on unplowed ground during the plowing operation, and serves to support the rear portion of the plow frame.

A related object is to provide adjustment for such rear wheel to control the depth of the furrow.

Another object is to provide a carrier for the left hand and right hand plough gangs, which is provided with trunnions adapted to engage one of a pair of spaced brackets mounted on the frame of the plow assembly in order to provide additional stiffness against deflection when one of the plow gangs is in operation.

Another object is to provide power means for laterally shifting the tongue of the plow assembly in coordination with the turning of the carrier to bring one of the plow gangs into operative position, in order that the plow assembly may be properly spaced laterally of the tractor, or other towing vehicle, as it moves back and forth across the field.

A further object is to provide means for jackknifing the tongue in coordination with vertical movement of the wheels supporting the plow assembly, in order to assist in bringing a plow gang from operative position to inoperative position above the ground surface.

Various other objects and advantageous features of this invention may be had from the following description, and the preferred embodiment thereof may be seen in the accompanying drawings, in which:

Figure 1 is a general perspective view showing a plow embodying my invention in operative position behind a tractor.

Figure 2 is a perspective view looking down on a portion of the frame of the plow assembly.

Figure 3 is a side elevation showing one of the plow gangs in operative plowing position.

Figure 4 is a view similar to Figure 3 showing the supporting wheels in their lowermost position, with the plow gangs positioned above the surface of the ground.

Figure 5 is a view similar to Figures 3 and 4, showing the tongue jackknifed to raise the plow gangs higher off the ground surface preparatory to rotating the assembly to bring the other gang of plow shares into operative position.

Figure 6 is a rear elevation, partly broken away, showing the left hand plow gang in operative plowing position.

Figure 7 is a sectional detail taken substantially on the line 7—7, as shown in Figure 6.

Figure 8 is a perspective view illustrating the tongue in jackknifed position, and with the main supporting wheels in their lowermost position with respect to the frame.

Figure 9 is a longitudinal sectional view, partly broken away, showing details of construction of the plow frame and carrier assembly.

Figure 10 is a transverse sectional view taken substantially on the line 10—10, as shown in Figure 9.

Figure 11:
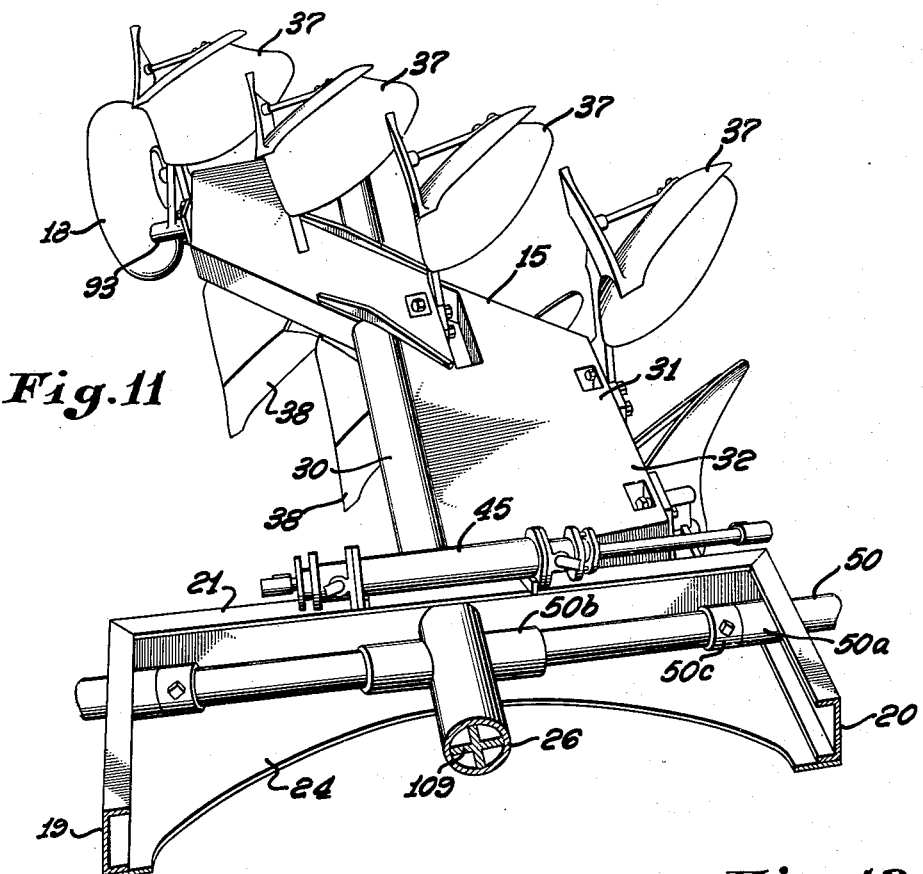
Figure 11 is a perspective view, partly in section, showing portions of the frame construction and right and left hand plow gangs.

Referring to the drawings, the plow assembly generally designated 10 is adapted to be towed behind a powered vehicle such as the tractor 11.

The plow assembly 10 includes a frame 12 which is carried on supporting wheels 13 and 14.

The assembly also includes a carrier 15 having a left hand plow gang 17 and a right hand plow gang 16. A rear wheel 18, mounted near the rear end of the carrier 15 serves to support the rear portion of the plow assembly and rolls on unplowed ground. The frame 12 includes a pair of side channels 19 and 20 which are in parallel spaced relationship, and which are connected by a rear channel 21 and forwardly extending channels 22 and 23. A bottom plate 24 extends between the side channels 19 and 20 to provide additional stiffness, and a cross beam 25 is interposed between the rear channel 21 and the forward channels 22 and 23.

A hollow stationary tube 26 is joined to the intersection of the channels 22 and 23 at its forward end and projects rearwardly parallel to the side channels 19 and 20, and through the brace 25 and rear channel 21. This hollow tube 26 extends rearwardly from the rear channel 21 and provides an elongated bearing surface 27 for the carrier 15. A thrust collar 28 is mounted on the extreme rear portion of the hollow tube and is attached thereto by threaded connections 29. The tube 26 may be provided with internal stiffening reinforcements 109.

Figure 12:
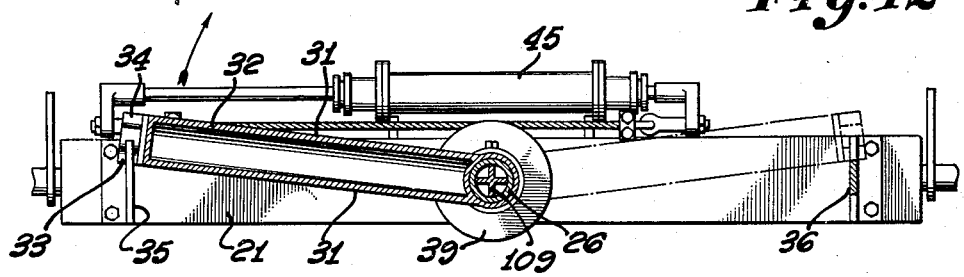
Figure 12 is a transverse sectional elevation, partly broken away, taken substantially on the line 12—12, as shown in Figure 9.

The carrier, generally designated 15, includes a pipe 30 welded to laterally extending parallel plates 31, forming a rigid box section, generally designated 32. A pair of trunnions 33 and 34 are carried at the outer forward end of the box section 32. As shown in Figure 12, the trunnion 33 is adapted to be supported by the bracket 35, and the trunnion 34 is adapted to be received by the bracket 36 when the box section 32 assumes the position illustrated by the dashed lines. The brackets 35 and 36 are secured to the rear channel 21 of the frame 12.

A series of left hand plow shares 38 are individually secured to the rear portion of the box section 32 and comprise the left hand plow gang 17. Each of these plow shares 38 may be of conventional design and individually bolted or otherwise attached to the box section 32 of the carrier 15. Any preferred type of plow share or plow disc may be used. Extending in an opposite direction from the plow shares 38 is another set of right hand plow shares 37 similarly mounted on the carrier 15 and comprising the right hand plow gang, generally designated 16. The carrier 15 may be rotated on the stationary tube 26, bringing either the plow gang 16 or 17 into operative position.

Means are provided on the frame 12 for rotating the carrier 15 from the position shown in Figure 1 to the position shown in Figure 11, and as is shown in the drawings, this means includes a torque-receiving element or drum 39 fixed to the forward end of the pipe 16 on the carrier 15 by any suitable means, such as the set screw 40. A helical groove 41 is formed in the drum 39 and is adapted to receive a plurality of wraps of the flexible cable 41. One end of the cable 41 is secured at 42 to rearwardly extending bracket 43 mounted on the extended end of piston rod 44. The piston rod 44 extends from both ends of the power cylinder 45 which is secured to the rear channel 21 of the frame 12. A bracket 46, mounted on the other end of the piston rod 44, is connected at 47 to the other end of the flexible cable 41. From this description, it will be understood that when pressure fluid is admitted into the power cylinder 45 via line 47, the piston rod is moved to the position shown in Figure 13 to revolve the carrier 15 and bring the right hand plow gang 16 into operative position. The rotation of the carrier 15 is arrested when the trunnion 33 engages the bracket 35. Similarly, when pressure fluid is admitted through the line 48 the piston rod 44 moves to the left, as is viewed in Figure 13, to turn the drum 39 and revolve the carrier 15 to bring the left hand plow gang 17 into operative position. In the latter position the trunnion 34 engages the bracket 36.

The supporting wheels 13 and 14 are each carried on an arm 48 and 49 which is pivotally mounted with respect to the frame 12. Since the mounting for the supporting wheel 14 is substantially a duplicate of the mounting provided for the wheel 13, only the latter will be described in detail. The arm 48 is fixed on a tubular shaft 50, projecting transversely of the frame 12 through the side channel 20 and stationary bearing sleeve 50a. The inner end of the tubular shaft 50 is received within stationary bearing sleeve 50b secured to the tube 26. A collar 50c removably secured to the shaft 50 engages the end of the bearing sleeve 50a to maintain the shaft in position. Fixed to the tubular shaft 50 is a crank arm 51, which is adapted to be actuated by a power cylinder 52. The rear end of the power cylinder is pivotally secured at 53 to a bracket 54, carried on the frame 12, and the piston rod 55, extending from the forward end of the power cylinder 52 is pivotally connected to the crank arm 51 at 56. A tension spring 57 is connected to the upper end of the crank arm 51 by means of the bracket 58 and pin 59, is adapted to counterbalance the weight of the frame assembly and thereby reduce the load imposed upon the power cylinder 52 in raising frame 12 with respect to the supporting wheel 13. The forward end of the tension spring 57 is secured by means of adjusting screw 60 to a stationary bracket 61 mounted on the channel 23 of the frame 12.

Means are provided for limiting the maximum descent of the frame 12 with respect to the supporting wheel 13, and as shown in Figure 3 of the drawings, this means includes a rod 62 pivotally attached to the crank arm 51 at 63, and extending through a stationary loop 64, carried on the bracket 54. A collar 65, telescopically mounted on the rod 62, is adapted to engage the loop 64 at one end and to engage the nut 66 at the other end. The nut 66 is threaded on the end of the rod 62.

When pressure fluid is supplied to the cylinder 52 the crank arm 51 and supporting arm 48 are rotated in a counterclockwise direction, as viewed in Figure 3, to bring the frame from the position shown in Figure 3 to the position shown in Figure 4. When the pressure fluid is allowed to escape from the power cylinder 52, the position of the parts returns to that shown in Figure 3, the frame and associated parts descending by gravity. A power cylinder 67, acting through parts similar to that described in connection with power cylinder 52, serves to control the position of the supporting wheel 14, and is assisted in this action by the tension spring 68 and the rod 69.

When a conventional one-way plow is used in plowing around the perimeter of a field, the relative widths of the tractor and plow are unimportant, and the tongue of the plow is arranged to position the plow assembly at the proper lateral spacing relative to the tractor. Once established, this adjustment need not be changed while the entire field is plowed. With a two-way plow, however, the plow assembly must ordinarily be shifted laterally with respect to the tractor each time the direction of the tractor is reversed.

Figure 13:
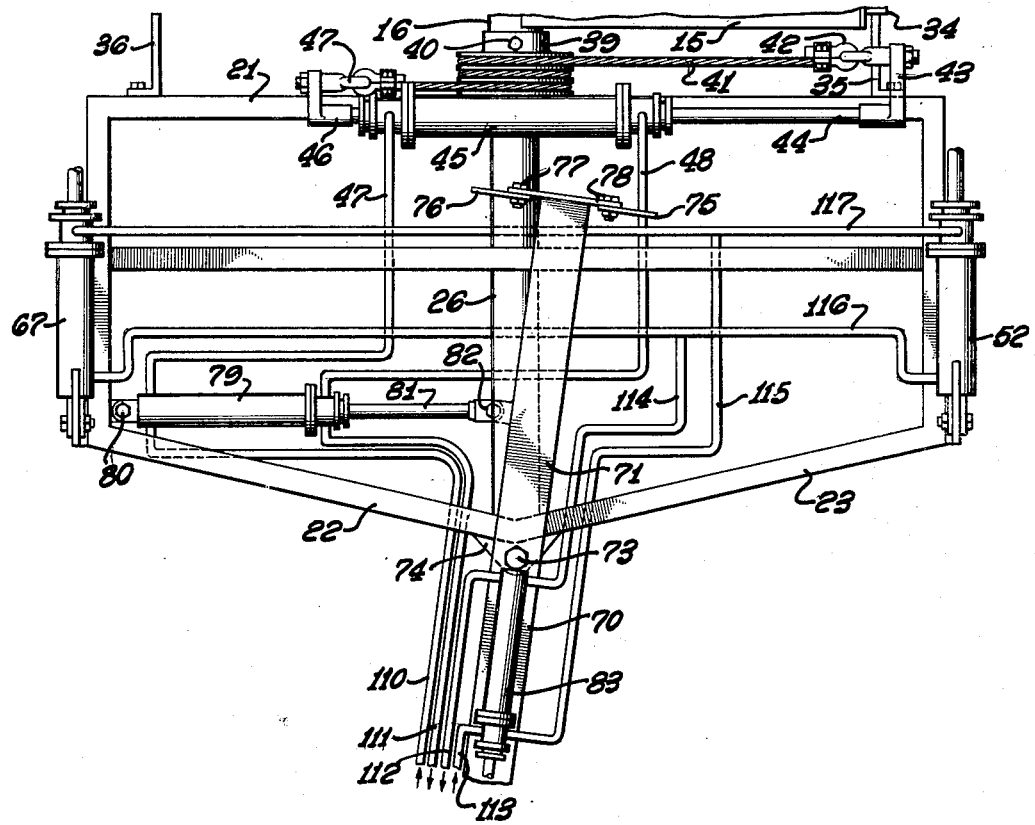
Figure 13 is a plan view showing connection of the hydraulic lines for operating the various power cylinders incorporated in the plow assembly.

Accordingly, I prefer to provide means on the plow assembly for automatically shifting the tongue laterally in order that the plow assembly shall always be laterally positioned at the proper spacing with respect to the tractor, irrespective of which one of the two plow gangs is in plowing position. As shown in Figures 8 and 13 of the drawings, the tongue 70 is bifurcated to provide an upper leg 71 and a lower leg 72, and the apex formed by the forward channels 22 and 23 of the frame 12 is received by the legs 71 and 72. A pivot pin 73 extends through the housing 74 secured to the channels 22 and 23, and serves to connect the tongue 70 to the frame 12. The rear ends of the legs 71 and 72 are connected by U shaped limit stops 75 and 76, which are bolted at 77 to flanges 78 provided on the legs 71 and 72.

The limit stops 75 and 76 alternately engage the stationary tube 26 to limit pivotal movement of the tongue 70 about the pivot pin 73. The limit stops 75 and 76 are adjustable with respect to the flanges 78 so that the maximum angularity of the tongue 70 may be changed to correspond to the widths of different tractors. Power means are provided for pivoting the tongue 70 with respect to the frame 12, and this means includes the power cylinder 79 which is pivotally secured to the frame at 80. The piston rod 81 extending from the power cylinder 79 is pivotally connected to the lower leg 72 of the tongue 70 at 82.

From this description, it will be understood that when the power cylinder 79 is energized to project the rod 81, the tongue 70 is moved pivotally in clockwise direction to assume the position shown in Figure 5. When the power cylinder 79 is energized to retract the piston rod 81 the tongue 70 is shifted to bring the limit stop 75 into contact with the outer surface of the tube 26.

A power cylinder 83 is pivotally secured at its rear end to a bracket 84 fixed on the upper leg 71 of the tongue 70. The piston rod 85 passes through a sleeve 86 which is pivotally received between the upward extending plates 87. A nut 88a threaded to the forward end of the rod 85 acts as a limit stop for the sleeve 86. The plates 87 form a crank arm integrally with the connector piece 88 and the latter forms an extension of the tongue 70. A horizontal pin 89 pivotally connects the connector piece 88 to the tongue 70, and a rectangular bracket 90 encircling the forward end of the tongue 70 serves to limit the extent of pivotal movement between the parts 88 and 70. A draft member 91 is provided at the forward end of the connector piece 88 for connection to the draft bar 92 of the tractor 11.

The function of the power cylinder 83 is to change the angular relationship of the tongue 70 and connector piece 88 by causing relative pivotal motion about the horizontal pin 89. The operation of the power cylinder 83 in moving the connector piece 88 from the position shown in Figure 3 to the position shown in Figure 5 is referred to as "jackknifing the tongue," and the purpose of this operation is to tilt the frame 12 about the main supporting wheels 13 and 14 to raise the plow gangs 16 and 17 clear of the ground surface. When pressure fluid is supplied to the power cylinder 83, the piston rod 85 is retracted and the engagement of the nut 88a with the sleeve 86 causes the crank arm 87 to pivot the forward end of the connector piece upwardly against the draft bar 92 on the tractor 11. The weight of the tractor 11 resists the upward force thus applied with the result that the plow gangs 16 and 17 are raised further off the ground than is possible by moving the wheels 13 and 14 downwardly with respect to the frame 12.

The piston rod 85 is sufficiently long to allow freedom of movement of the sleeve 86 thereon while one of the plow gangs 16 or 17 is in normal operation. Small irregularities in level of the land cause the plow frame 12 to tilt relative to the tractor 11, and this action causes pivotal movement between the parts 88 and 70, without applying any substantial vertical forces to the draft bar 92 of the tractor 11.

The rear wheel 18 cooperates with the main supporting wheels 13 and 14 to support the plow frame 12 independently of the tractor 11. As shown in Figures 7 and 11 of the drawings, a supporting arm 93 is pivotally secured by pin 94 to the rear portion of the box section 32. The wheel 18 is carried on the arm 93 by means of the axle 95. A bracket 96 secured to the end of the box section is provided with spaced vertical slots 97 and 98, and limit stops 99 and 100 are adjustably positioned in these slots. The stop 99 extends through the slot 97 to engage the surface 101 of the supporting arm 93, and similarly the stop 100 extends through the slot 98 to engage the surface 102 of the supporting arm 93. The stops 99 and 100 may be set to provide any desired extent of angular travel of the arm 93 about the pin 94.

When the left hand plow gang 17 is in operation, as shown in Figure 6, the arm 93 is in contact with the stop 99, and when the right hand gang 16 is in operation, as shown in Figure 1, the arm 93 is in contact with the stop 100. Adjustment of the stops 99 and 100 provides for variation in the depth of the furrows.

As shown in Figure 13, four hydraulic lines extend between the plow assembly and the tractor for operation of the various power cylinders 45, 52, 67, 79 and 83 which are carried on the plow frame 12. A pump and suitable valve control assembly, not shown, are provided on the tractor 11. The lines 110 and 111 operate the power cylinders 45 and 79 conjointly and in unison, and hence rotation of the carrier 15 and lateral shifting of the tongue 70 are coordinated. The lines 112 and 113 operate the power cylinders 52, 67 and 83, and hence raising and lowering of the frame 12 on the main supporting wheels 13 and 14 is coordinated with jackknifing of the tongue. The hydraulic line 110 connects with the left end of the double acting cylinder 79 and the line 111 connects with its right end. The hydraulic leads 47 and 48 serve to connect the cylinders 45 and 79 in parallel. Similarly, the line 112 connects to the rear end of cylinder 83, and line 113 connects to its forward end. The cylinders 52 and 67 are connected in parallel with the cylinder 83 by means of the leads 114, 115, 116 and 117.

Pressure supplied in line 113 from the pump (not shown) causes the cylinder 83 to jackknife the tongue and causes the cylinders 52 and 67 to raise the frame 12 relative to the main supporting wheels 13 and 14, the return fluid from the cylinders passing through line 112 back to the pump. If pressure should be supplied to the line 112 by the pump, the gravity descent of the frame 12 relative to the wheels 13 and 14 would be hastened. Assuming the frame 12 to be in its upper position, pressure supplied to the line 110 by the pump causes the cylinder 79 to shift the tongue 70 to the position shown in Figure 13 and causes the cylinder 45 to rotate the carrier 15 to bring the right hand plow gang 16 into position, the return fluid from the cylinders 79 and 45 passing through line 111 back to the pump. If pressure is supplied to the line 111, the tongue 70 is shifted to the opposite side and left hand plow gang 17 is brought into position, the line 110 serving as a return to the pump.

In the operation of that form of my device as shown in Figures 1 to 13, the plow 10 is attached behind the tractor 11 by connecting the draft element 91 to the draft bar 92, and the four hydraulic lines 110, 111, 112 and 113 are connected to the hydraulic pump (not shown) on the tractor. Pressure fluid is admitted through line 113 to cause the power cylinders 52 and 67 to raise the frame 12 and plow gangs 16 and 17 to their highest position, and the power cylinder 83 jackknifes the tongue of the plow to further elevate the plow gangs. The tractor 11 then tows the plow 10 to the field where plowing is to be done. Assuming that the nuts 66 and limit stops 99 and 100 have been previously set to produce the desired depth of furrows, the plow is brought into operation by lowering the proper plow gang 16 or 17 into the earth as the tractor moves across the field. Assuming that the right hand plow gang 16 is in operation, as shown in Figure 1, the frame 12 and right hand plow shares 37 descend until further descent is prevented by the rear wheel 18, and by the stop sleeves 65 meeting the stationary abutments 64.

When the far end of the field is reached, the right hand plow gang 16 is brought out of the earth while the tractor is still under forward motion. This is accomplished by admitting pressure fluid to the power cylinders 52, 67 and 83, as described above, the tongue being jackknifed to raise the plow gang 16 clear of the earth by a safe margin. The tractor and plow assembly are then turned around on the field to head back toward the starting point. The left hand plow gang 17 is rotated into position by admitting pressure fluid into the cylinder 45 via the lines 111 and 48, and this action serves to cause the cylinder 79 to shift the tongue 70 about the pin 73, as shown. The tractor starts back parallel to the furrow just completed, rolling on the unplowed ground, and towing the plow assembly 10 with the wheel 13 rolling in the furrow as shown in Figure 6. The plowshares 38 enter the earth when pressure is relaxed from the power cylinders 52 and 67. When the end of the field is reached from which plowing operations were originally started, the left hand plow gang 17 is withdrawn from the earth, the tractor and plow assembly are turned around and again started toward the far end of the field with the wheel 14 rolling in the furrow and the right hand plow gang 16 in operation.

It should be noted that each time the tractor and plow are turned around at the end of the field that the tongue 70 is automatically shifted when the plowgang carrier is revolved, and hence the plow assembly is always positioned at the correct lateral spacing behind the tractor. Hence the tractor rolls along the unplowed ground next to the furrow, and the proper side supporting wheel 13 or 14 on the plow assembly rolls in the furrow.

During the plowing operation the plow assembly rolls on its three wheels 13, 14 and 18 and no vertical forces are transmitted to the tractor. Slight irregularities or unevenness in the ground surface are permitted by the connector piece 88 which pivots about the horizontal pin 89 at the forward end of the tongue 70.

Having fully described my invention, it is to be understood that I do not wish to be limited to the details herein set forth, but my invention is of the full scope of the appended claims.

I claim:

1. In a two-way plow assembly, the combination of a mobile frame, a carrier mounted on the frame and provided with a right hand plow and a left hand plow, means on the frame adapted to turn the carrier about an axis extending longitudinally of the frame to bring either plow into operative position, and a single supporting wheel on the carrier laterally offset from said axis to roll on unplowed ground when either plow is in operation.

2. In a two-way plow assembly, the combination of a frame, side supporting wheels for said frame, means on the frame for raising the frame relative to said wheels, a carrier mounted on the frame and provided with a right hand plow and a left hand plow, means on the frame adapted to turn the carrier about an axis extending longitudinally of the frame to bring either plow into operative position, and a single rear supporting wheel on the carrier laterally offset from said axis to roll on unplowed ground when either plow is in operation, said rear supporting wheel cooperating with the side supporting wheels to support the frame in operative position.

3. In a two-way plow assembly, the combination of a frame, a stationary member extending rearwardly from the frame, a carrier turnably mounted on said member and provided with a right hand plow and a left hand plow, means on the frame adapted to turn the carrier relative to said member to bring either plow into operative position, and a supporting wheel mounted near the rear end of the carrier at a location laterally offset from the stationary member, whereby it may roll on unplowed ground when either plow is in operation.

4. In a two-way plow assembly, the combination of a frame, a pair of laterally spaced ground-contacting wheels for supporting said frame, a carrier mounted on the frame and provided with a right hand plow and a left hand plow, a third supporting wheel on the carrier at the rear end thereof, means on the frame for raising the frame and carrier relative to said pair of side supporting wheels, said means acting to lift the plows and third wheel clear of the ground, and means on the frame for rotating the carrier and third supporting wheel about a longitudinal axis to bring either plow into operative position, said third supporting wheel rolling upon unplowed ground when either plow is in plowing position.

5. In a two-way plow assembly, the combination of a frame, a stationary longitudinal member fixed on and extending rearwardly from the frame, a carrier axially insertable on said member in telescopic relation, right and left hand plow gangs on said carrier, power means on the frame adapted to turn the carrier to bring either plow gang into operative position, and a thrust collar removably positioned on said member at the rear end of said carrier adapted to maintain the carrier in position relative to the frame.

6. In a two-way plow assembly, the combination of a frame, a tongue pivotally connected to the frame for relative lateral movement, a carrier mounted on the frame and provided with a right hand plow and a left hand plow, first power means on the frame for moving the carrier to bring either plow into operative position, second power means on the frame for shifting the tongue, and stationary power transmitting elements interconnecting said first and second power means for conjoint operation, whereby the tongue is shifted in response to movement of the carrier.

7. In a two-way plow assembly, the combination of a mobile frame, a forwardly extending tongue pivotally connected to the frame for relative lateral movement, a rearwardly extending carrier on the frame provided with a right hand plow and a left hand plow, first hydraulic means for turning the carrier about a longitudinal axis to bring either plow into operative position, second hydraulic means on the frame for shifting the tongue, and hydraulic conduits connecting said first and second hydraulic means for conjoint operation, whereby the tongue is shifted in accordance with movement of the carrier.

8. In a two-way plow assembly, the combination of a mobile frame, a forwardly extending tongue pivotally connected to the frame for relative lateral movement, a rearwardly extending carrier on the frame provided with a right hand plow and a left hand plow, fluid pressure responsive means adapted to turn the carrier about a longitudinal axis to bring either plow into operative position, additional fluid pressure responsive means on the frame for shifting the tongue, and fluid conduit means connecting the two said fluid pressure responsive means in parallel for conjoint operation, whereby the tongue is shifted in accordance with movement of the carrier.

9. In a two-way plow assembly, the combination of a mobile frame, a forwardly extending tongue pivotally connected to the frame for relative lateral movement, a rearwardly extending carrier on the frame provided with a right hand plow and a left hand plow, a pair of double acting hydraulic power cylinders on the frame, one of said power cylinders being adapted to turn the carrier to bring either plow into operative position, and the other power cylinder being adapted to shift the tongue in either direction, and means including hydraulic lines for connecting said power cylinders in parallel for operation in unison.

10. In a two-way plow assembly, the combination of a stationary beam member extending longitudinally in the direction of normal movement of the plow assembly, a carrier turnably mounted on said beam member between the ends thereof and provided with a right hand plow and a left hand plow, a cross member fixed relative to said beam member at a position in advance of said carrier and plows, lift means connected with the cross-member for lifting the entire length of the beam member and thereby raising the carrier and plows out of ground-engaging position, and power means mounted on the cross member operatively connected to the carrier to bring either plow into operative position.

11. In a two-way plow assembly, the combination of a stationary beam member extending longitudinally in the direction of normal movement of the plow assembly, a carrier turnably mounted on said beam member and provided with a right hand plow and a left hand plow, a cross member fixed relative to said beam member at a position in advance of said carrier and plows, lift means connected with the cross-member for lifting the entire length of the beam member and thereby raising the carrier and plows out of ground-engaging position, a spooling drum on the forward end of the carrier, a flexible cable spooled on said drum, and power means independent of the lift means mounted on the cross member and operatively connected to the cable, the power means acting through the cable and drum to turn the carrier to bring either plow into operative position.

12. In a two-way plow assembly, the combination of a stationary beam member extending longitudinally in the direction of normal movement of the plow assembly, a carrier turnably mounted on said beam member between the ends thereof and provided with a right hand plow and a left hand plow, a cross member fixed relative to said beam member at a position in advance of said carrier and plows, means including a hydraulic power cylinder carried on the cross member for turning the carrier to bring either plow into operative position, and lift means connected with the cross member for lifting the entire length of the beam member and thereby raising the carrier and plows out of ground-engaging position.

13. In a two-way plow assembly, the combination of a stationary beam member extending longitudinally in the direction of normal movement of the plow assembly, a carrier turnably mounted on said beam member and provided with a right hand plow and a left hand plow, a cross member fixed relative to said beam member at a position in advance of said carrier and plows, power means including a double-acting hydraulic cylinder mounted on the cross member parallel thereto, a flexible element connected for operation by said hydraulic cylinder and encircling a portion of the carrier to bring either plow into operative position, and lift means connected with the ends of the cross member for lifting the carrier and plows out of ground-engaging position.

14. In a two-way plow assembly, the combination of: a frame, a pair of laterally spaced ground-contacting wheels for supporting the frame, a rearwardly extending beam fixed to said frame, a carrier turnably mounted on the beam intermediate the ends thereof and provided with a right-hand plow and a left-hand plow, a tail wheel supported on the carrier, means on the frame for raising the frame and carrier relative to said pair of supporting wheels, said means acting to tilt the beam and raise its outer end to lift the plows and tail wheel clear of the ground, and means on the frame independent of movement of the plow assembly relative to the ground for turning the carrier relative to the beam to bring either plow into operative position.

15. In a two-way plow assembly, the combination of: a frame, a pair of laterally spaced ground-contacting wheels for supporting the frame, a forwardly extending tongue pivotally connected to the frame and adapted for connection to a towing vehicle, a rearwardly extending beam fixed to said frame, a carrier turnably mounted on the beam intermediate the ends thereof and provided with a right-hand plow and a left-hand plow, a tail wheel supported on the carrier, means on the frame independent of movement of the plow assembly relative to the ground for raising the frame and carrier relative to said pair of supporting wheels, said means acting to tilt the beam about the forward end of the tongue and raise the outer end of the beam to lift the plows and tail wheel clear of the ground, and means on the frame for turning the carrier relative to the beam to bring either plow into operative position.

16. In a two-way plow assembly, the combination of: a frame, a pair of laterally spaced ground-contacting wheels for supporting the frame, a forwardly extending tongue pivotally connected to the frame and adapted for connection to a towing vehicle, a rearwardly extending beam fixed to said frame at longitudinally spaced locations, a carrier mounted to turn on the beam and provided with a right-hand plow and a left-hand plow, a tail wheel supported on the carrier adapted to roll on unplowed ground when either plow is in operation, means on the frame for raising the frame and carrier relative to said pair of supporting wheels, said means acting to raise the beam and lift the plows and tail wheel clear of the ground, first power means on the frame for moving the carrier to bring either plow into operative position, second power means on the frame for shifting the tongue toward the same side of the frame on which the tail wheel is positioned, and means interconnecting the first and second power means for conjoint operation.

17. In a two-way plow assembly, the combination of: a frame, a stationary longitudinal beam fixed on the frame and extending rearwardly therefrom, a carrier turnably mounted on the beam and provided with ground-engaging plow means for producing either a right-hand furrow or a left-hand furrow, means for turning the carrier to either of two operative positions relative to the frame to cause the plow means to produce a right-hand furrow or a left-hand furrow as desired, means to support the plow assembly in operative position, said means including a pair of laterally spaced ground-contacting wheels on the frame and a third supporting wheel on the carrier laterally offset to roll on unplowed ground in either operative position of the carrier, and means on the frame for raising the frame and carrier relative to said pair of side supporting wheels.

18. In a two-way plow assembly, the combination of: a mobile frame having a rearwardly extending longitudinal beam fixed thereto, a carrier turnably mounted on the beam intermediate the ends thereof and provided with ground-engaging plow gangs for producing either a right-hand furrow or a left-hand furrow, means on the frame for turning the carrier to either of two operative positions relative to the frame to cause the plow gangs to produce a right-hand furrow or a left-hand furrow as desired, each plow gang including a plurality of individual plow bodies symmetrically positioned on the carrier so that in operative position on level ground each plow gang has at least one plow body on each side of a vertical plane containing the axis of said beam, and inter-engaging means on the carrier and frame adapted to limit the extent of turning movement of the carrier relative to the frame.

19. In a two-way plow assembly, the combination of: a frame, a stationary longitudinal member fixed on and extending rearwardly from the frame, ground-engaging wheels supporting the frame, a carrier axially insertable on said longitudinal member in telescopic relation, the carrier having ground-engaging plow means for producing either a right-hand furrow or a left-hand furrow, power means on the frame for turning the carrier to either of two operative positions relative to the frame to cause the plow means to produce a right-hand furrow or a left-hand furrow as desired, means on the frame to raise and lower the frame relative to said wheels, and a thrust collar removably positioned on said longitudinal member at the rear end of said carrier adapted to maintain the carrier in position relative to the frame.

20. In a two-way plow assembly, the combination of: a frame, a tongue pivotally connected to the frame for relative lateral movement, a carrier mounted on the frame and provided with ground-engaging plow means for producing either a right-hand furrow or a left-hand furrow, power means on the frame for turning the carrier to either of two operative positions relative to the frame to cause the plow means to produce a right-hand furrow or a left-hand furrow as desired, second power means on the frame for shifting the tongue, and stationary power-transmitting elements interconnecting said first and second power means for conjoint operation, whereby the tongue is shifted in response to movement of the carrier.

21. In a two-way plow assembly, the combination of: a mobile frame, a forwardly extending tongue pivotally connected to the frame for relative lateral movement, a rearwardly extending carrier on the frame provided with ground-engaging plow means for producing either a right-hand furrow or a left-hand furrow, first hydraulic means on the frame for turning the carrier to either of two operative positions relative to the frame to cause the plow means to produce a right-hand furrow or a left-hand furrow as desired, second hydraulic means on the frame for shifting the tongue, and hydraulic conduits connecting said first and second hydraulic means for conjoint operation, whereby the tongue is shifted in accordance with movement of the carrier.

22. In a two-way plow assembly, the combination of: a mobile frame, a forwardly extending tongue pivotally connected to the frame for relative lateral movement, a rearwardly extending carrier on the frame provided with ground-engaging plow means for producing either a right-hand furrow or a left-hand furrow, fluid pressure responsive means on the frame for turning the carrier to either of two operative positions relative to the frame to cause the plow means to produce a right-hand furrow or a left-hand furrow as desired, additional fluid pressure responsive means on the frame for shifting the tongue, and fluid conduit means connecting the two said fluid pressure responsive means in parallel for conjoint operation, whereby the tongue is shifted in accordance with movement of the carrier.

23. In a two-way plow assembly, the combination of: a mobile frame, a forwardly extending tongue pivotally connected to the frame for relative lateral movement, a rearwardly extending carrier on the frame provided with ground-engaging plow means for producing either a right-hand furrow or a left-hand furrow, a pair of double-acting hydraulic power cylinders on the frame, one of said power cylinders being adapted to turn the carrier to either of two operative positions relative to the frame to cause the plow means to produce a right-hand furrow or a left-hand furrow as desired, and the other power cylinder being adapted to shift the tongue in either direction, and means including hydraulic lines for connecting said power cylinders in parallel for operation in unison.

24. In a two-way plow assembly, the combination of: a frame, a pair of laterally spaced ground-contacting wheels for supporting the frame, a forwardly extending tongue pivotally connected to the frame and adapted for connection to a towing vehicle, a rearwardly extending beam fixed to said frame at longitudinally spaced locations, a carrier mounted to turn relative to the beam and provided with ground-engaging plow means for producing either a right-hand furrow or a left-hand furrow, a tail wheel assembly supported on the carrier, means on the frame for raising the frame and carrier relative to said pair of supporting wheels, said means acting to raise the beam and lift the plow means and tail wheel assembly clear of the ground, first power means on the frame for turning the carrier to either of two operative positions relative to the frame to cause the plow means to produce a right-hand furrow or a left-hand furrow as desired, second power means on the frame for shifting the tongue toward the same side of the frame on which the tail wheel assembly is positioned, and means interconnecting the first and second power means for conjoint operation.

25. In a two-way plow assembly, the combination of: a frame, a stationary longitudinal member fixed on and extending rearwardly from the frame, a carrier having a tubular element axially insertable on the longitudinal member in telescopic relation, a thrust collar removably positioned at the rearward end of said longitudinal member and engaging the rear end of said tubular element to maintain the carrier in position relative to the frame, ground-engaging plow means for producing either a right-hand furrow or a left-hand furrow, support means for said plow means mounted on said tubular element at a location in advance of the position of said thrust collar, and power means on the frame for turning the carrier to either of two operative positions relative to the frame to cause the plow means to produce a right-hand furrow or a left-hand furrow, as desired.

26. In a two-way plow assembly, the combination of: a frame, a stationary longitudinal member fixed on and extending rearwardly from the frame, a carrier having a tubular element axially insertable on the longitudinal member in telescopic relation, a thrust collar removably positioned at the rearward end of said longitudinal member and engaging the rear end of said tubular element to maintain the carrier in position relative to the frame, a right-hand plow and a left-hand plow for producing either a right-hand furrow or a left-hand furrow, support means for said plows mounted on said tubular element at a location in advance of the position of said thrust collar, and power means on the frame for turning the carrier to either of two operative positions relative to the frame to bring either of said plows into ground-engaging position.

27. In a two-way plow assembly, the combination of: a frame, a stationary longitudinal beam member fixed on and extending rearwardly from the frame, a carrier turnably mounted on the beam member and provided with ground-engaging plow means for producing a right-hand furrow or a left-hand furrow, power means for turning the carrier relative to the beam member including a torque receiving element fixed on the forward end of said carrier, a hydraulic power cylinder assembly mounted on the frame and having a power element movable in a plane normal to said beam member, and means including an intermediate power transmitting element operatively interposed between the power element and the torque receiving element, whereby the power cylinder assembly may turn the carrier in either direction.

HARRY A. PURSCHE.

REFERENCES CITED

The following references are of record in the file of this patent:

UNITED STATES PATENTS

| Number | Name | Date |
|---|---|---|
| 219,220 | Chapman | Sept. 2, 1879 |
| 258,288 | Durfee | May 23, 1882 |
| 714,570 | Fowler | Nov. 25, 1902 |
| 808,727 | Connor | Jan. 2, 1906 |
| 997,102 | Tholl | July 4, 1911 |
| 1,517,086 | Mattice | Nov. 25, 1924 |
| 1,578,084 | Neufang | Mar. 23, 1926 |
| 1,604,338 | Caughey | Oct. 26, 1926 |
| 1,908,095 | York | May 9, 1933 |
| 1,915,844 | York | June 27, 1933 |
| 2,113,556 | De Rocher | Apr. 5, 1938 |
| 2,195,631 | Post et al. | Apr. 2, 1940 |
| 2,304,383 | Strandlund | Dec. 8, 1942 |
| 2,320,742 | Newkirk | June 1, 1943 |
| 2,335,231 | Armington et al. | Nov. 30, 1943 |

FOREIGN PATENTS

| Number | Country | Date |
|---|---|---|
| 556,073 | France | Apr. 6, 1923 |
| 49,222 | Germany | Oct. 21, 1889 |
| 1,150 | Great Britain | of 1872 |
| 265,607 | Great Britain | Jan. 26, 1928 |
| 494,750 | Great Britain | 1938 |
| 563,349 | Great Britain | Aug. 10, 1944 |
| 571,354 | Great Britain | Aug. 21, 1945 |
| 7,339 | Switzerland | Sept. 20, 1893 |